United States Patent
Hanson et al.

(10) Patent No.: US 11,336,083 B2
(45) Date of Patent: May 17, 2022

(54) POWER CONVERTER MONITOR AND METHOD OF USE

(71) Applicant: Hamilton Sundstrand Corporation, Charlotte, NC (US)

(72) Inventors: Michael J. Hanson, Rockford, IL (US); Frank Z. Feng, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 58 days.

(21) Appl. No.: 16/674,951

(22) Filed: Nov. 5, 2019

(65) Prior Publication Data
US 2021/0135448 A1    May 6, 2021

(51) Int. Cl.
| | |
|---|---|
| *H02H 7/12* | (2006.01) |
| *B64F 5/60* | (2017.01) |
| *B64D 41/00* | (2006.01) |
| *H02M 1/32* | (2007.01) |
| *H02M 1/36* | (2007.01) |

(52) U.S. Cl.
CPC ........... *H02H 7/1203* (2013.01); *B64D 41/00* (2013.01); *B64F 5/60* (2017.01); *H02M 1/32* (2013.01); *H02M 1/36* (2013.01)

(58) Field of Classification Search
CPC ............ B64F 5/60; B64D 41/00; H02M 1/32; H02M 13/06; H02H 7/1203
See application file for complete search history.

(56) References Cited

U.S. PATENT DOCUMENTS

| | | | |
|---|---|---|---|
| 5,978,195 A | 11/1999 | Goder et al. | |
| 8,860,394 B2 | 10/2014 | Houston et al. | |
| 9,374,003 B1 | 6/2016 | McJimsey et al. | |
| 9,438,109 B2 | 9/2016 | Moon et al. | |
| 2004/0212942 A1 | 10/2004 | Balakrishnan | |
| 2008/0304195 A1* | 12/2008 | Lin | H02M 1/4225 361/89 |
| 2010/0103567 A1 | 4/2010 | Saeck et al. | |
| 2011/0267853 A1* | 11/2011 | Yang | H02M 1/32 363/56.01 |
| 2015/0244259 A1* | 8/2015 | Kaiser | B60R 16/033 307/9.1 |

FOREIGN PATENT DOCUMENTS

JP    H05336652 A    12/1993

OTHER PUBLICATIONS

Extended European search report issued in corresponding EP application No. 20204447.5, dated Mar. 23, 2021.

* cited by examiner

*Primary Examiner* — Jue Zhang
(74) *Attorney, Agent, or Firm* — Locke Lord LLP; Joshua L. Jones; Scott D. Wofsy

(57) ABSTRACT

A power converter monitor having built-in fault tolerance and containment including a plurality of voltage inputs operatively connected to a pulse timing device, a respective comparator electrically connected to each of the voltage inputs, an and-gate electrically connected in series to each of the comparators and wherein the pulse timing device is operatively connected by the and-gate and a-not gate to each of the voltage inputs configured to reset a detected voltage output fault and provide a converter inhibit pulse if the voltage output fault is detected.

12 Claims, 3 Drawing Sheets

US 11,336,083 B2

POWER CONVERTER MONITOR AND METHOD OF USE

BACKGROUND

Technological Field

The present disclosure relates to a power converter, and more particularly to a power converter having built in fault containment.

Description of Related Art

DC-to-DC converters and DC-to-AC converters are used anytime a conversion from one voltage to another voltage is needed, such as 270 volts to 28V. For conversion from AC to DC, a TRU (transformer-rectifier unit) is used, for AC-to AC, a transformer is used. When starting with DC at the input, a power converter must be used.

Converters must be fault tolerant such that they protect both the output cabling and themselves from faults on one or more outputs. If a converter is sourcing a fault, and the input power source is inadequate to source the fault, the Power Converter input source will droop, causing the Power Converter to momentarily lose power. It is possible that the converter's input source power is inadequate to source a fault on the output of the Power Converter. This situation represents improper trip coordination, but is not detectable, and therefore represents a "dormant" fault. In such a situation, the Power Converter input voltage can collapse before the Power Converter can respond to the downstream fault according to its own design parameters. This can result in the Power Converter becoming unpowered momentarily and losing knowledge that the fault is present.

When the Power Converter loses input power, and hence stops converting power, it is no longer sourcing the fault, and the overload of the input power source is removed. The source power then returns, the power converter attempts to restore output power, and resumes sourcing the same fault. This cycle continues to repeat, and is called "doorbelling". If the doorbelling condition persists, damage to the Power Converter can occur. A microprocessor solution has been previously used to solve the doorbelling problem. However, especially in an aerospace application that imposes DO-178 processes on any embedded software, the microprocessor solution can be too expensive and cumbersome, and there exists a need to address power converters that are powered by another power converter with active over current protection. Accordingly, there is still a need in the art for a power converter fault detector having improved reliability and simplicity that is economically viable. The present disclosure may provide a solution for at least one of these remaining challenges.

SUMMARY OF THE INVENTION

A power converter monitor, for an aircraft environment, having built-in fault tolerance and containment includes a plurality of voltage inputs operatively connected to a pulse timing device, a respective comparator electrically connected to each of the voltage inputs, an and-gate electrically connected in series to each of the comparators, wherein the pulse timing device is operatively connected by the and-gate and a-not gate to each of the voltage inputs configured to reset a detected voltage output fault and provide a converter inhibit pulse if the voltage output fault is detected. Comparator output can pass through a respective flip-flop device. The comparators in turn drive the flip-flops, which in turn drive the pulse timing device through the AND gate. The flip-flops "remember" if the outputs have risen to an acceptable output voltage since Converter Enable became active. The power converter monitor does not include a microprocessor.

The pulse timing device can include a stand-alone power supply with hold-up capacitance. The amount of hold-up is sufficient for the monitor to continue operating for as long as necessary for the input voltage to return. The pulse timing device can be a low power digital counter, a low power analog or digital one-shot.

A method of operating the power converter is also disclosed, the method includes operating a power converter, detecting an input power fault by a pulse timing device within a power conversion monitor, classifying the fault as a true fault or a power interruption and inhibiting power conversion by sending an inhibit pulse to the conversion control for a predefined period of time in order to prevent an endless fault loop if the fault is a true fault. Output voltage can be used in detecting the power fault. The fault can cause a doorbelling of the power converter. Power conversion can be inhibited for a predetermined amount of time based on thermal recovery of the power converter. The method can also include restarting the power converter without sending a converter inhibit pulse if a power output is above a predetermined threshold.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
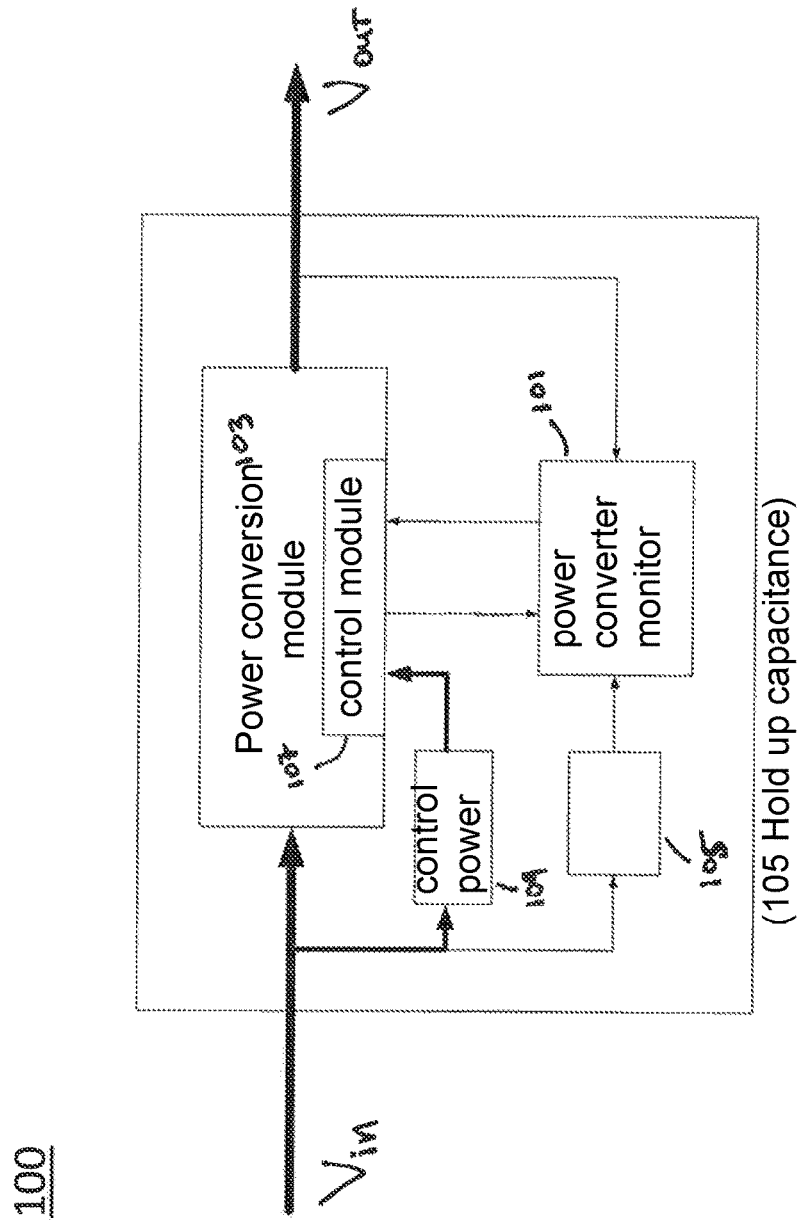
FIG. 1 is a schematic view of a power converter.

Reference will now be made to the drawings wherein like reference numerals identify similar structural features or aspects of the subject invention. For purposes of explanation and illustration, and not limitation, a partial view of an exemplary embodiment of a power converter schematic in accordance with the disclosure is shown in FIG. 1 and is designated generally by reference character 100. Other aspects of the converter in accordance with the disclosure, or aspects thereof, are provided in FIGS. 2 and 3, as will be described. The methods and systems of the invention can be used to manage the output of power converters with active over current protection and to reduce the risk of doorbelling and other power interruption faults in power converters.

FIG. 1 shows an internal schematic of a power converter 100. The power converter is used to convert input power to a different voltage output power as discussed previously. The power converter 100 is intended to be used in an aircraft environment. The converter includes a power converter monitor 101 and a power conversion module 103 including a conversion control module 107, and a control power 109 operatively connected to the conversion control module 107 for powering the power conversion module 103.

Figure 2:
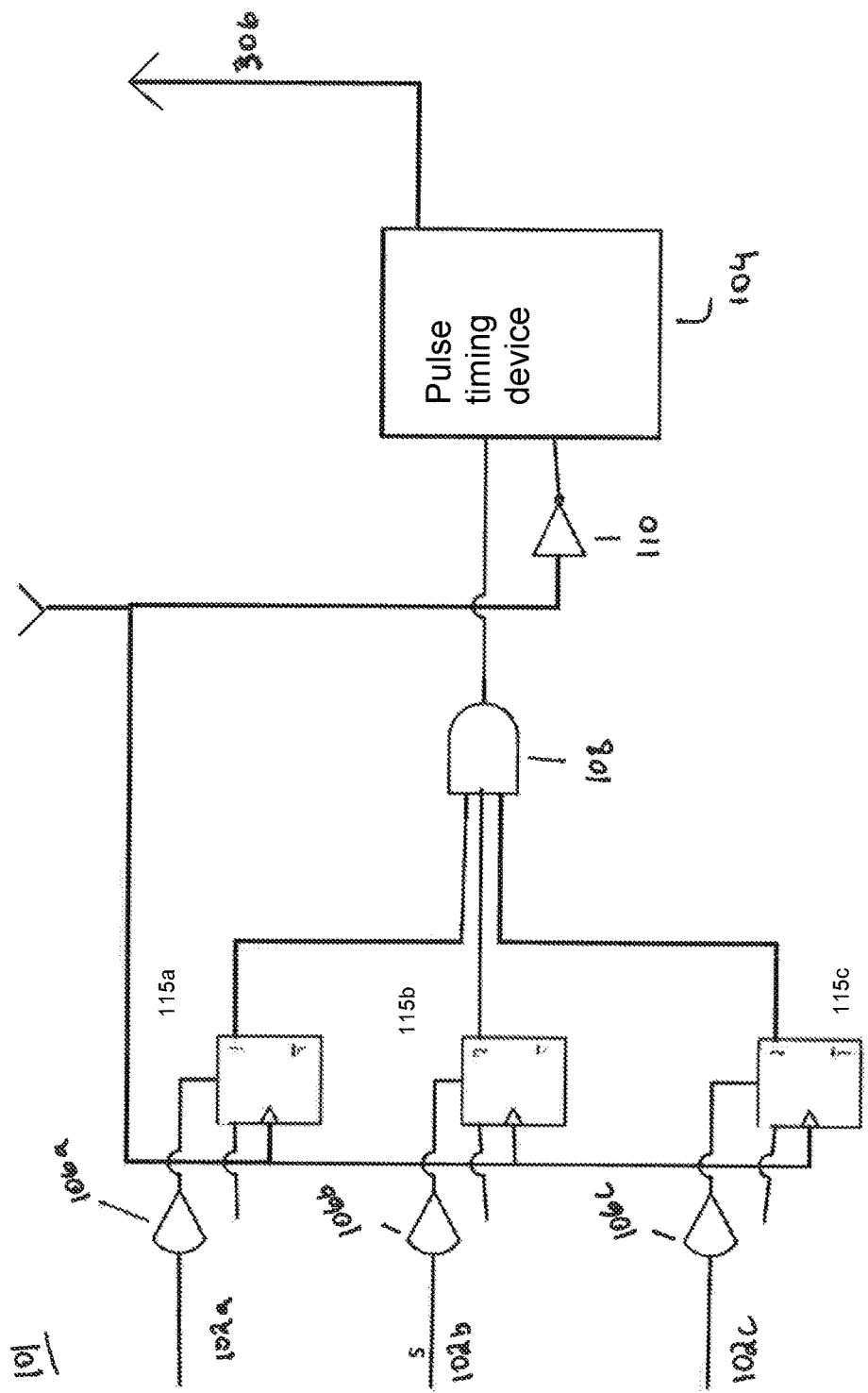
FIG. 2 is a schematic view of a power converter monitor of FIG. 1.

FIG. 2 shows a detailed version of the power converter monitor 101 with a plurality of voltage inputs 102a-c operatively connected to a pulse timing device 104. The pulse timing device 104 produces a pulse of pre-defined duration when a clock input rises while the reset input is inactive. The pulse timing device 104 could act as a monostable multi-vibrator. A respective comparator 106a-c is electrically connected to each of the voltage inputs 102a-c. An and-gate 108 is electrically connected in series to each of the comparators 106a-c. The comparator 106a-c output a Boolean condition of whether the converter output voltage is exceeding a specified threshold. The comparator 106a-c output passes through a flip-flop device 115a-c. The comparators 106a-c drive the flip-flops, which in turn drive the pulse timing device 104 through the AND gate 108. The flip-flops 115a-c "remember" if the outputs have risen to an acceptable output voltage since Converter Enable became active. The pulse timing device 104 is operatively connected by the and-gate 108 and a-not gate 110 to each of the voltage inputs 102a-c and configured to reset a detected voltage output fault and provide a converter inhibit pulse if the voltage output fault is detected. The power converter 100 is not connected to and does not include a microprocessor, which can be expensive, especially when meeting the requirements of DO-178, which is required in aerospace situations. The pulse timing device 104 includes a stand-alone power supply with hold-up capacitance 105 (shown in in FIG. 1) which allows for the device to keep functioning and monitoring when a power interruption happens. The pulse timing device 104 is considered to be a low power digital counter, or an analog or digital one-shot.

Figure 3:
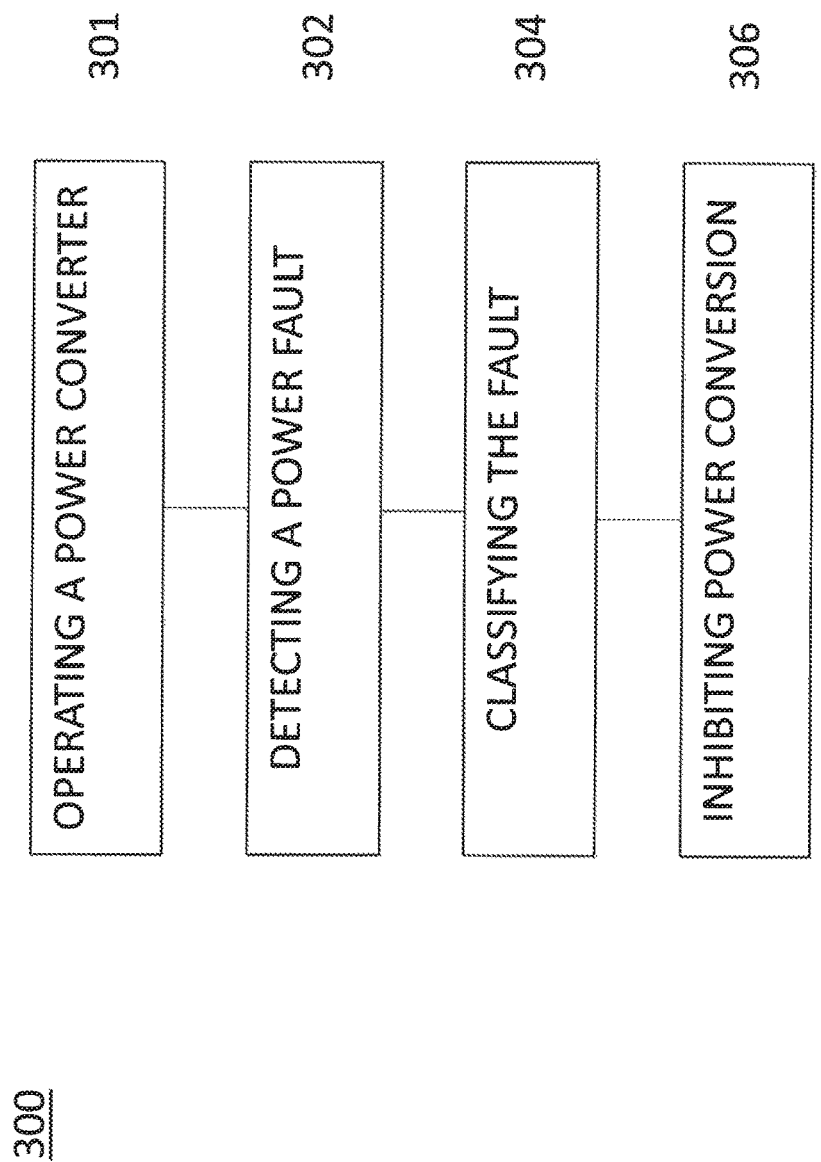
FIG. 3 is a block diagram showing a method of use of the power converter of FIG. 1.

As shown in FIG. 3 a method 300 for operating the power converter includes detecting 302 an input power fault by a pulse timing device, classifying 304 the fault as a true fault or a power interruption, wherein the state of the Inhibit Lockout signal, at the time the converter enable signal transitions inactive, determines the classification, and inhibiting 306 power conversion by a pulse for a predefined period of time in order to prevent a fault loop, or doorbelling, if the fault is a true fault. The inhibit pulse is sent to the control of the power converter. Output voltage is used in detecting the power fault. If a power interruption occurs at a time prior to all outputs producing an acceptable output, it is assumed that a fault on one or more outputs produced the input droop. In this case, power conversion will be inhibited for a period of time. This period is for a predetermined amount of time based on thermal recovery of the power converter.

If the power interruption is the result of a fault that occurs while output power is being delivered, the power interruption may be misdiagnosed on the first power droop. The result will be to resume trying to source a fault, at which time the second "droop" will be recognized as fault-induced.

It is necessary for the monitor to be powered from an internally generated control power source different than the power conversion control. A high-wattage Power Converter requires profoundly more internal control power than a monitor circuit. The demand on this internal control power supply can be substantial when commutating large switching devices. This means that energy storage to "hold up" internal control power through power interruptions can also be impractically large.

Devices used in Aerospace must recover from a momentary power interruption, per Power Quality requirements in DO-160. Therefore, droop on input power occurring at a time when output voltage is being produced, must not be treated as a fault. Otherwise, the initial mis-diagnosis of a fault introduced during power conversion will not make sense. Output voltage is used to detect mis-coordinated trip, namely because the fault trip is already mis-coordinated, and the system cannot assume the output current will be high enough to sense as a fault, when the system doesn't recognize what output current will cause the input source to collapse.

The methods and systems of the present disclosure, as described above and shown in the drawings, provide for a power converter with superior properties including increased reliability and stability, and reduced size, weight, complexity, and cost. While the apparatus and methods of the subject disclosure have been showing and described with reference to embodiments, those skilled in the art will readily appreciate that changes and/or modifications may be made thereto without departing from the spirit and score of the subject disclosure.

Tolerance to power input droop not caused by a load fault, is necessary, and must not cause an inhibit pulse.

What is claimed is:

1. A power converter monitor having built-in fault tolerance and containment comprising:
   a plurality of voltage inputs operatively connected to a pulse timing device;
   a respective comparator electrically connected to each of the voltage inputs;
   an and-gate electrically connected in series to each of the comparators, the pulse timing device being operatively connected by the and-gate and a-not gate to each of the voltage inputs configured to reset a detected voltage output fault and provide a converter inhibit pulse if the voltage output fault is detected, wherein the pulse timing device is a low power digital one-shot.

2. The power converter monitor of claim 1, wherein the power converter monitor does not include a microprocessor.

3. The power converter monitor of claim 1, wherein the pulse timing device includes a power supply with hold-up capacitance.

4. The power converter monitor of claim 1, wherein the power monitor is in an aircraft environment.

5. A power converter comprising:
   a power conversion module including a conversion control module therein;
   a control power operatively connected to the conversion control module for powering the power conversion module;
   a power converter monitor having built-in fault tolerance and containment comprising:
   a plurality of voltage inputs operatively connected to a pulse timing device, wherein the pulse timing device is a low power digital one-shot;
   a respective comparator amplifier electrically connected to each of the voltage inputs;
   an and-gate electrically connected in series to each of the comparators; and
   wherein the pulse timing device is operatively connected by the and-gate and a-not gate to each of the voltage inputs configured to reset a detected voltage output fault and provide a converter inhibit pulse if the voltage output fault is detected.

6. The power converter of claim 5, wherein the pulse timing device includes a stand-alone power supply with hold-up capacitance.

7. A method comprising:
- operating a power converter;
- detecting an input power fault by a pulse timing device;
- classifying the fault as a true fault or a power interruption; and
- inhibiting power conversion by sending an inhibit pulse to the power converter for a predefined period of time in order to prevent an endless fault loop if the fault is a true fault, wherein power conversion is inhibited for a predetermined amount of time based on thermal recovery of the power converter.

8. The method of claim 7, wherein an output voltage is used in detecting a power fault.

9. The method of claim 7, wherein the fault causes a doorbelling of the power converted.

10. The method of claim 7, further comprising monitoring a power converter enable signal of the power converter and a power input.

11. The method of claim 10, wherein monitoring includes passing a comparator output through a flip-flop device, the flip-flops remembering if outputs have risen to an acceptable output voltage since a converter enable signal became active.

12. The method of claim 7, further comprising restarting the power converter without sending a converter inhibit pulse if a power output was above a predetermined threshold.

* * * * *